(12) United States Patent
Sasaki et al.

(10) Patent No.: US 6,456,790 B2
(45) Date of Patent: Sep. 24, 2002

(54) IMAGE-TREMBLE-CORRECTING SYSTEM FOR OPTICAL INSTRUMENT

(75) Inventors: Takamitsu Sasaki; Yukio Uenaka, both of Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/785,185

(22) Filed: Feb. 20, 2001

(30) Foreign Application Priority Data

Feb. 17, 2000 (JP) ..................................... P2000-039320

(51) Int. Cl.⁷ ............................. G03B 5/00; G02B 27/64
(52) U.S. Cl. ........................................................ 396/55
(58) Field of Search ............................................. 396/55

(56) References Cited

U.S. PATENT DOCUMENTS

| | | | |
|---|---|---|---|
| 5,305,040 A | 4/1994 | Enomoto | 396/55 |
| 5,541,693 A | 7/1996 | Enomoto | 396/55 |
| 5,583,597 A | 12/1996 | Enomoto | 396/55 |
| 5,655,157 A | 8/1997 | Enomoto | 396/55 |
| 5,721,969 A | 2/1998 | Arai | 396/55 |
| 5,854,947 A * | 12/1998 | Imura | 396/55 |
| 6,043,934 A | 3/2000 | Hirunuma et al. | 396/55 X |
| 6,046,853 A | 4/2000 | Yano | 359/557 |
| 6,057,962 A | 5/2000 | Hirunuma et al. | 359/557 |

* cited by examiner

Primary Examiner—W. B. Perkey
(74) Attorney, Agent, or Firm—Greenblum & Bernstein, P.L.C.

(57) ABSTRACT

In an image-tremble-correcting system for an optical instrument, having an optical focussing system for producing a focussed image, to correct a tremble of the focussed image caused by an oscillation of the optical instrument, a movable optical tremble-correction system is assembled in the focussing system of the optical instrument. An X-Y rectangular coordinate system which is defined on a plane perpendicular to the optical axis of the focussing system, the origin of the coordinate system coinciding with the optical axis of the focussing system, the X- and Y-axes thereof defining an angle of 45° with a horizontal axis and a vertical axis defined on the plane when the optical instrument is positioned at a usual attitude. The movable optical tremble-correction system being movable along the X-axis and the Y-axis of the X-Y rectangular coordinate system to the same extent.

8 Claims, 10 Drawing Sheets

IMAGE-TREMBLE-CORRECTING SYSTEM FOR OPTICAL INSTRUMENT

BACKGROUND OF THE INVENTION

1. Field of the Invention

This invention relates to an image-tremble-correcting system for an optical instrument having an image-focussing lens system, such as a still camera, a video camera, a telescope, a pair of binoculars or the like, to correct a tremble of a focussed image caused by an oscillation of the optical instrument due to, for example, a hand tremble.

2. Description of the Related Art

For example, such an image-tremble-correcting system is frequently incorporated in a photographing lens system of a single lens reflex (SLR) type camera. The image-tremble-correcting system comprises a movable image-tremble-correcting lens system assembled in the photographing lens system, a tremble sensor system that detects an amount of tremble of the camera, and therefore a focussed image, caused by an oscillation of the camera due to, for example, a hand tremble, and a driving system that moves the movable image-tremble-correcting lens system to thereby neutralize the tremble of the focussed image.

Of course, the movement of the image-tremble-correcting-lens system is mechanically limited, and thus it is impossible to correct the tremble of the focussed image beyond the limits of movement of the image-tremble-correcting-lens system. Although it is possible to widen the range through which the image-tremble-correcting-lens system can be moved, widening of the range is impossible without an increase in bulkiness of the photographing lens system.

As is well known, in the SLR camera, an image to be photographed is observed via a viewfinder system through the photographing lens system, and the image-tremble-correcting system is operated when a release switch button is partly depressed, i.e. when a photometry switch is turned ON to perform a photometry measurement. Thus, while the image to be photographed is being observed through the viewfinder in the course of the photometry measurement, image tremble is corrected.

During the photometry measurement, the SLR camera is often panned widely in vertical and/or horizontal directions to frame the image to be performed. At this time, the image-tremble-correcting-lens system may easily reach a limit position due to the wide movement of the SLR camera in the vertical and/or horizontal directions, resulting in an awkward motion of the image as observed through the viewfinder system. Of course, the awkward motion of the image gives a photographer an uncomfortable feeling.

Note, the same is true for other optical instruments, such as a video camera, a telescope, a pair of binoculars or the like.

SUMMARY OF THE INVENTION

Therefore, an object of the present invention is to provide an image-tremble-correcting system for an optical instrument, which is constituted such that vertical and horizontal limitations of movement of an image-tremble-correcting-lens system can be widened without increasing the mechanical bulkiness of a photographing lens system.

In accordance with the present invention, there is provided an image-tremble-correcting system for an optical instrument, having an optical focussing system for producing a focussed image, to correct a tremble of the focussed image caused by an oscillation of the optical instrument. The image-tremble-correcting system comprises a movable optical tremble-correction system assembled in the optical focussing system of the optical instrument, and an X-Y rectangular coordinate system which is defined on a geometrical plane perpendicular to an optical axis of the optical focussing system. An origin of the X-Y rectangular coordinate system coincides with the optical axis of the optical focussing system, and the X- and Y-axes thereof define an angle of 45° with a horizontal axis and a vertical axis defined on the geometrical plane when the optical instrument is positioned at a usual attitude. The image-tremble-correcting system further comprises a first position-detecting system that detects a position of the movable optical tremble-correction system along the X-axis of the X-Y rectangular coordinate system, a second position-detecting system that detects a position of the movable optical tremble-correction system along the Y-axis of the X-Y rectangular coordinate system, a first driving system that moves the movable optical tremble-correction system along the X-axis of the X-Y rectangular coordinate system, a second driving system that moves the movable optical tremble-correction system along the Y-axis of the X-Y rectangular coordinate system, a tremble-sensor system that detects an amount of tremble of the focussed image with respect to the X-Y rectangular coordinate system, and a controller that controls the first and second driving system to move the movable optical tremble-correction system along the X- and Y-axes of the X-Y rectangular coordinate system, such that the amount of tremble of the focussed image is neutralized.

Preferably, the movable optical tremble-correction system is movable along the X-axis and the Y-axis of the X-Y rectangular coordinate system to the same extent, such that the movement of the movable optical tremble-correction system is restricted in a square area.

The image-tremble-correcting system may further comprise a first limit-position-determination system that determines whether the position detected by the first position-detecting system is a first limit position along the X-axis of the X-Y rectangular coordinate system, a first correction-limit-determination system that determines whether an amount of tremble of the focussed image along the X-axis of the X-Y rectangular coordinate system exceeds the first limit position, when it is determined by the first limit-position-determination system that the position detected by the first position-detecting system is the first limit position along the X-axis of the X-Y rectangular coordinate system, a second limit-position-determination system that determines whether the position detected by the second position-detecting system is a second limit position along the Y-axis of the X-Y rectangular coordinate system, and a second correction-limit-determination system that determines whether an amount of tremble of the focussed image along the Y-axis of the X-Y rectangular coordinate system exceeds the second limit position, when it is determined by the second limit-position-determination system that the position detected by the second position-detecting system is the second limit position along the Y-axis of the X-Y rectangular coordinate system.

In this case, the controller ceases controlling the first driving system when it is determined by the first correction-limit-determination system that the amount of tremble of the focussed image along the X-axis of the X-Y rectangular coordinate system exceeds the first limit position. Similarly, the controller ceases controlling the second driving system when it is determined by the second correction-limit-determination system that the amount of tremble of the focussed image along the Y-axis of the X-Y rectangular coordinate system exceeds the second limit position.

The tremble-sensor system may include a first angular speed sensor that detects a first angular speed of the optical instrument around the X-axis of the X-Y rectangular coordinate system, and a second angular speed sensor that detects a second angular speed of the optical instrument around the Y-axis of the X-Y rectangular coordinate system. In this case, the controlling of the respective first and second driving systems by the controller is performed on the basis of the first and second angular speed detected by the first and second angular speed sensors.

Preferably, the respective first and second driving systems comprise a first electromagnetic driving system and a second electromagnetic driving system. In this case, both a direction and a magnitude of an electric current, flowing through the first electromagnetic driving system, is controlled by the controller on the basis of the position of the movable optical tremble-correction system, detected by the first position-detecting system, and the first angular speed detected by the first angular speed sensor, thereby determining both a direction and an acceleration of the movement of the movable optical tremble-correction system along the X-axis of the X-Y rectangular coordinate system. Similarly, both a direction and a magnitude of an electric current, flowing through the second electromagnetic driving system, is controlled by the controller on the basis of the position of the movable optical tremble-correction system, detected by the second position-detecting system, and the second angular speed detected by the second angular speed sensor, thereby determining both a direction and an acceleration of the movement of the movable optical tremble-correction system along the Y-axis of the X-Y rectangular coordinate system.

For example, the optical instrument may comprise a single lens reflex camera having a photographing optical system as the optical focussing system. In this case, preferably, the movable optical tremble-correction system, the first and second position-detecting systems, and the first and second driving systems are assembled as an image-tremble-correcting unit in the photographing optical system.

BRIEF DESCRIPTION OF THE DRAWINGS

The object and other objects of the present invention will be better understood from the following description, with reference to the accompanying drawings, in which.

DESCRIPTION OF THE PREFERRED EMBODIMENTS

Figure 1:
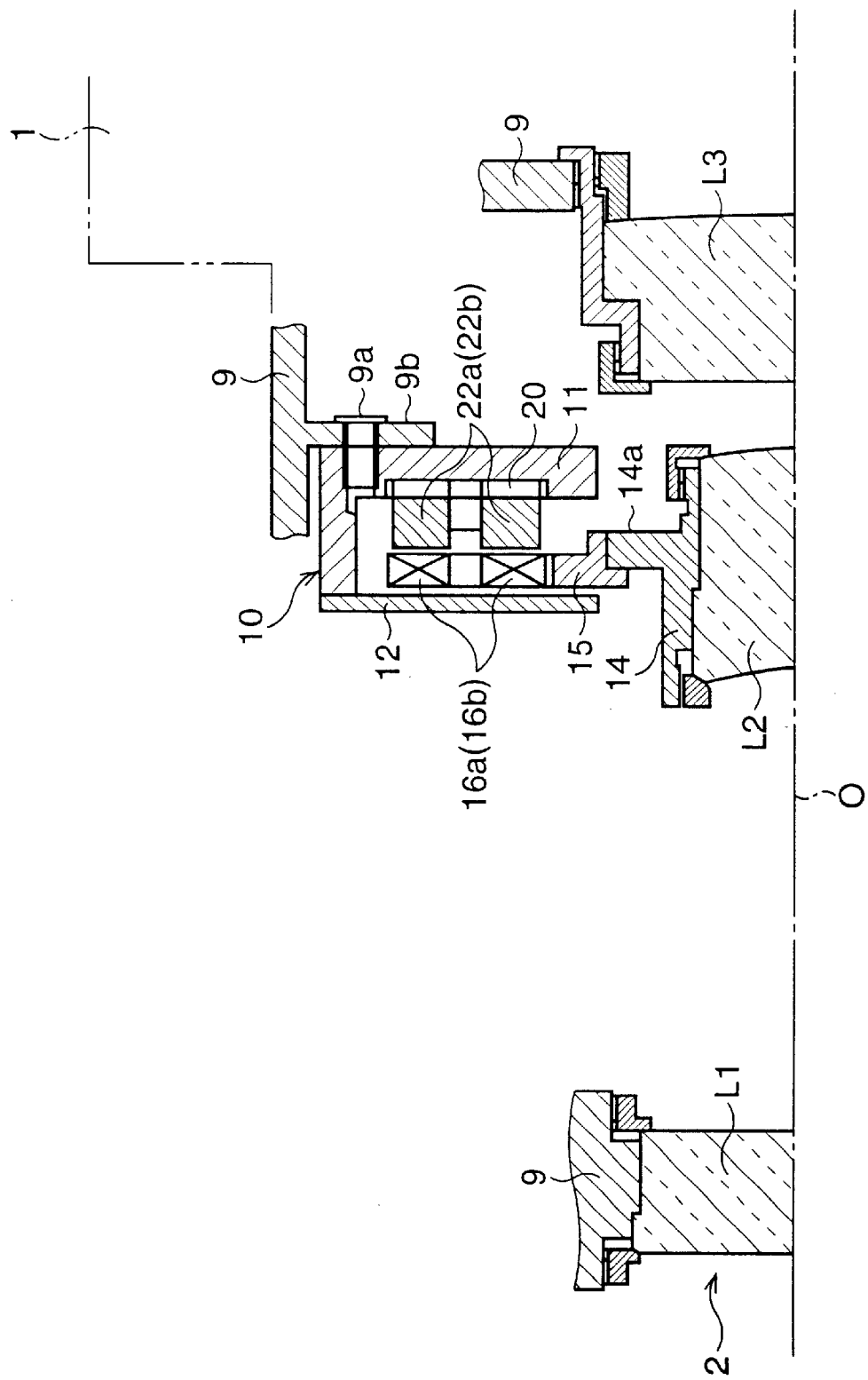
FIG. 1 is a schematic longitudinal sectional view showing a part of a single lens reflex (SLR) type camera, in which an image-tremble-correcting system according to the present invention is embodied.

FIG. 1 partially and schematically shows a lens barrel of a single lens reflex (SLR) type camera, in which an image-tremble-correcting system according to the present invention is embodied. In this drawing, a camera body of the camera is indicated by reference 1, and the lens barrel is indicated by reference 9.

The lens barrel 9 contains a photographing optical system, generally indicated by reference 2, and the photographing optical system 2 includes a first group of lenses L1, a second group of lenses L2, and a third group of lenses L3. The first and third groups of lenses L1 and L3 form a photographing lens system having an optical axis O. The second group of lenses L2 serves as an image-tremble-correcting lens system, which is movable along a geometrical plane perpendicular to the optical axis O of the photographing lens system (L1 and L3). Namely, an X-Y rectangular coordinate system is defined on the aforesaid geometrical plane such that the origin thereof coincides with the optical axis O of the photographing lens system (L1 and L3), and the image-tremble-correcting lens system (L2) is movable along the X-axis and the Y-axis of the X-Y rectangular coordinate system.

Figure 2:
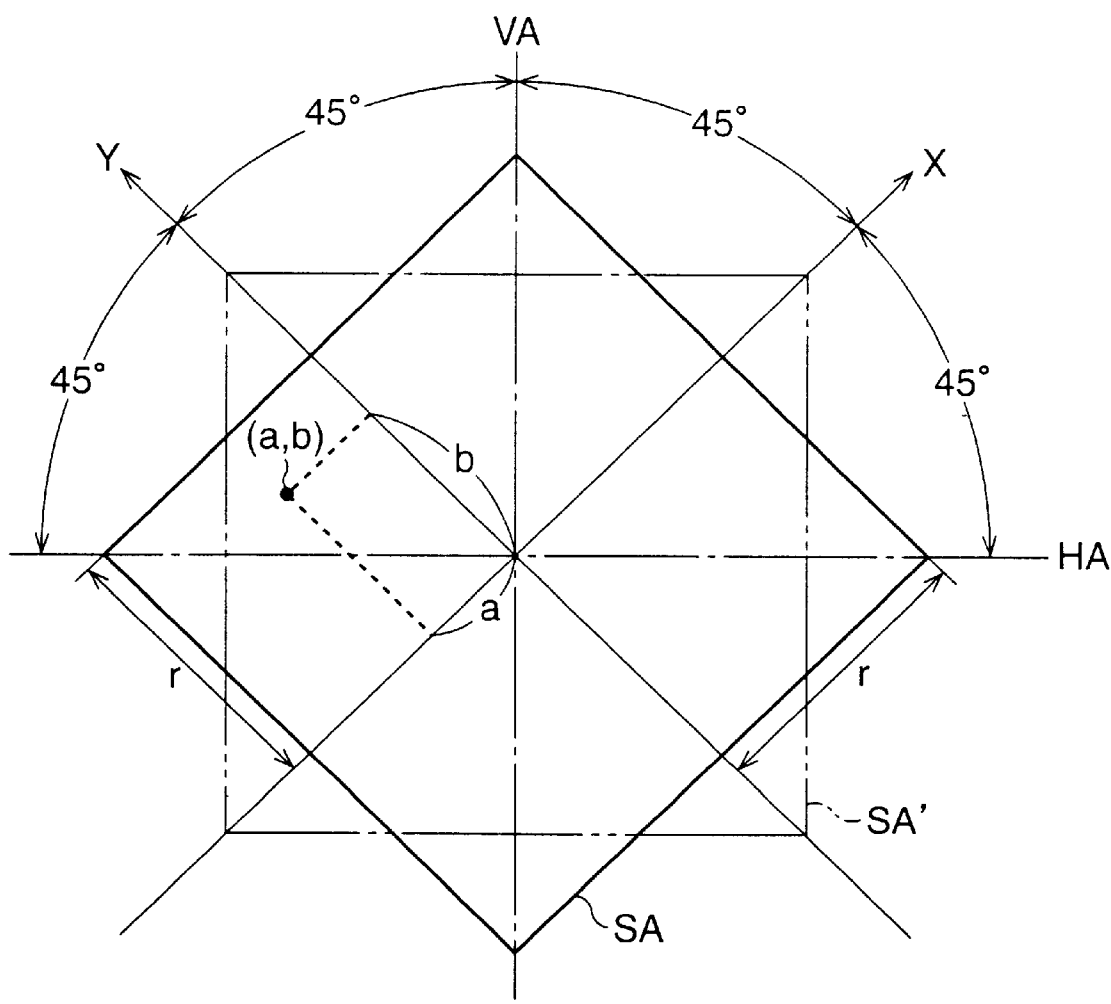
FIG. 2 is a view showing an X-Y rectangular coordinate system defined on a geometrical plane perpendicular to an optical axis of a photographing lens system of the SLR camera such that an image-tramble-correcting lens system is movable along the X- and Y-axes thereof, the X- and Y-axes of the X-Y coordinate system defining an angle of 45° with a horizontal axis and a vertical axis, which are defined on the geometrical plane when the SLR camera is held by hand at a usual photographing attitude.

As shown in FIG. 2, the X-Y rectangular coordinate system is set such that the X- and Y-axes thereof define an angle of 45° with a horizontal axis HA and a vertical axis VA, which are defined on the aforesaid geometrical plane when the camera is held by hand at a usual photographing attitude such that a central lengthwise axis of a rectangular frame of photographic film, which is positioned at an image plane defined by the photographing lens system (L1 and L3), is horizontally oriented.

During a photographing operation, when an image to be photographed is subjected to a tremble caused by an oscillation of the camera due to, for example, a hand tremble, the image-tremble-correcting lens system (L2) is moved along the X- and Y-axes of the X-Y rectangular coordinate system such that the tremble of the image to be photographed is neutralized, whereby the image to be photographed remains still despite the oscillation of the camera.

In FIG. 2, an amount of movement of the image-tremble-correcting lens system (L2) along the X-axis of the X-Y rectangular coordinate system is represented by an X coordinate "a", and an amount of movement of the image-tremble-correcting lens system (L2) along the Y-axis of the X-Y rectangular coordinate system is represented by a Y coordinate "b". In this embodiment, as mentioned hereinafter, each absolute value of the X and Y coordinates "a" and "b" is mechanically limited to a maximum value "r", and thus the movement of the image-tremble-correcting lens system (L2) is restricted in a square area SA with four sides having a length of "2r", as shown in FIG. 2.

Therefore, when the camera is held by hand at the usual photographing attitude, a maximum range R, in which the image-tremble-correcting lens system (L2) can be moved along each of the horizontal axis HA and the vertical axis VA, is defined by the following formula:

$$R=(8r^2)^{1/2}$$

In order to systematically move the image-tremble lens system (L2) along the X- and Y-axes of the X-Y coordinate system, the image-tremble-correcting lens system (L2) is integrally and securely held in a barrel frame 14, and is assembled in an image-tremble-correcting unit 10.

Figure 3:
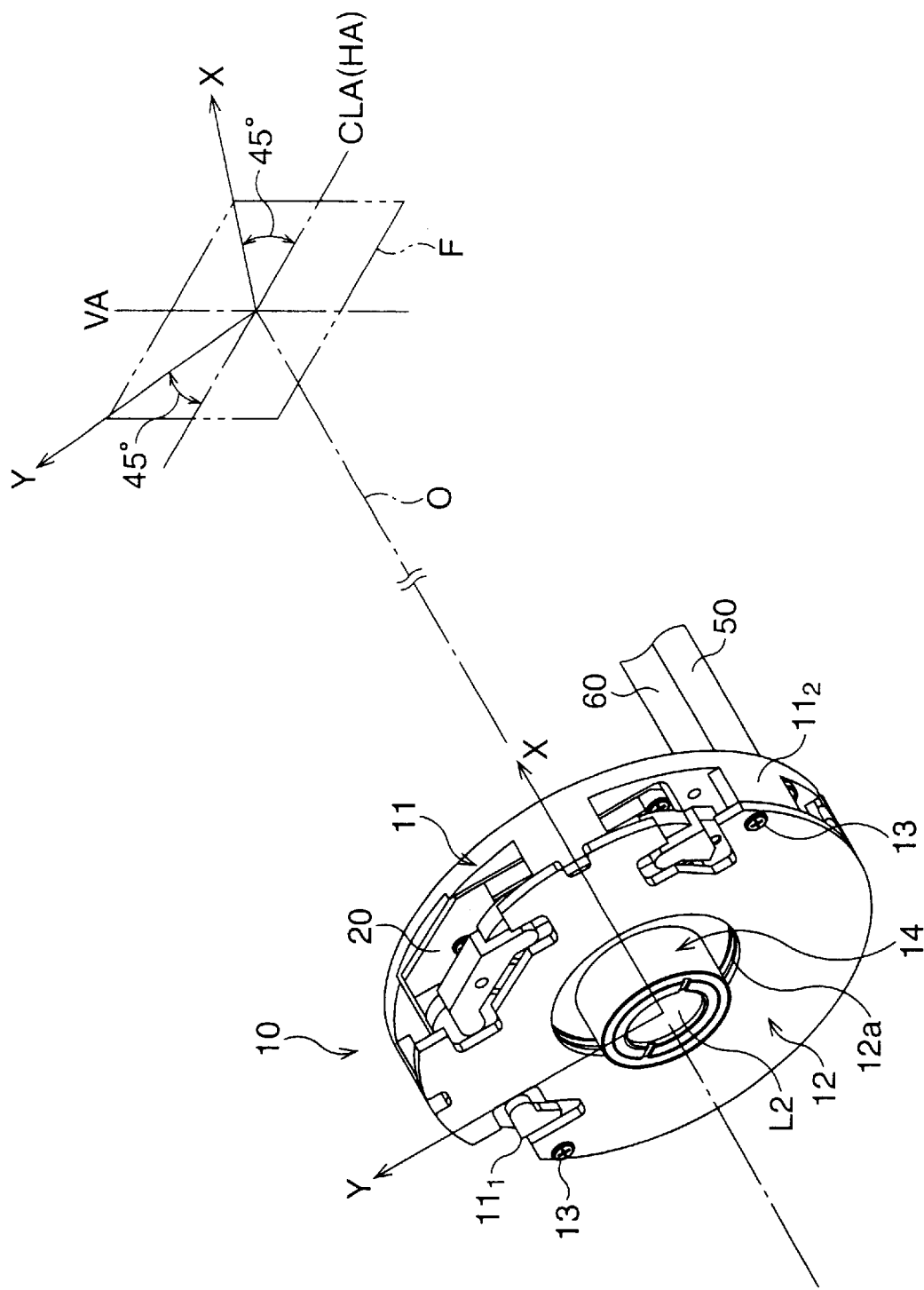
FIG. 3 is a perspective view showing a positional relationship between an image-tremble-correcting unit and a frame of photographic film.
Figure 4:
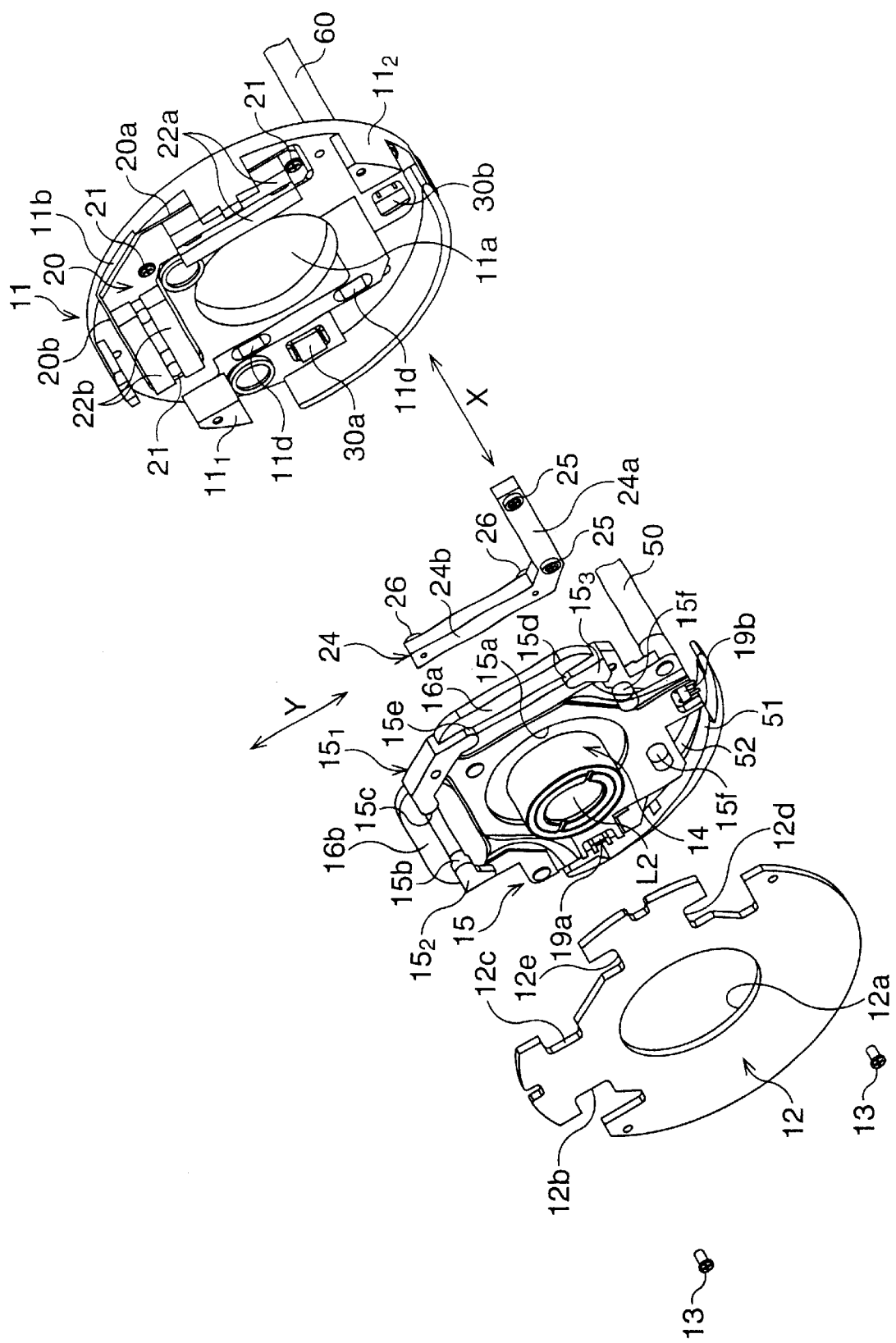
FIG. 4 is an exploded view showing the image-tremble-correcting unit.

As shown in FIGS. 3 and 4, the image-tremble-correcting unit 10 includes an annular plate body 11 having a circular opening 11a formed therein, and the annular plate body 11 is immovably supported by the lens barrel 9. Namely, as shown in FIG. 1, an inner ring element 9b is integrally protruded from an inner surface of the lens barrel 9, and the annular plate body 11 is securely attached to the inner ring element 9b by screws represented by 9a. As best shown in FIG. 4, the annular plate body 11 is integrally formed with two spacer block elements 111 and 112 which are diametrically arranged at the circumference of the annular plate body 11.

The image-tremble-correcting unit 10 also includes a generally annular yoke plate 12 having a circular opening 12a formed therein, and the annular yoke plate 12 is securely attached to the spacer block elements 111 and 112 by screws 13. The circular openings 11a and 12a are coaxially aligned with each other, and have a central axis which coincides with the optical axis O of the photographing lens system (L1 and L3).

The image-tremble-correcting unit 10 further includes a movable plate frame 15 having a circular opening 15a formed therein, and the movable plate frame 15 securely supports the barrel frame 14 holding the image-tremble-correcting lens system (L2). The barrel frame 14 is integrally formed with an annular flange 14a (FIG. 1), and the annular flange 14a of the barrel frame 14 is fixed to an annular rim of the circular opening 15a of the movable plate frame 15, with the barrel frame 14 passing through the circular opening 15a, as best shown in FIG. 4.

The movable plate frame 15 is movably received in a space between the annular plate body 11 and the annular yoke plate 12, such that the movable plate frame 15, and therefore the lens system (L2), can be moved along the X- and Y-axes of the X-Y coordinate system, as explained in detail hereinafter.

In FIG. 3, reference F indicates a rectangular frame of photographic film which is positioned at the image plane defined by the photographing lens system (L1 and L3). When the X-Y coordinate system is projected onto the photographic film frame F, as shown in FIG. 3, the X- and Y-axes thereof form an angle of 45° with a central lengthwise axis CLA of the photographic film frame F. Thus, when the horizontal and vertical axes HA and VA (FIG. 2) are projected onto the photographic film frame F provided that the camera is held by hand at the usual photographing attitude, the horizontal axis HA coincides with the central lengthwise axis CLA of the photographic film frame F.

As shown in FIG. 4, an L-shaped movable member 24 is arranged between the annular plate body 11 and the movable plate frame 15, and has two arms 24a and 24b which form a right angle. The arm 24a is provided with a pair of ring-like guide rollers 25 rotatably attached to a side face directed toward the movable plate frame 15, and the arm 24b is provided with a pair of ring-like guide rollers 26 rotatably attached to a side face directed toward the annular plate body 11.

Figure 5:
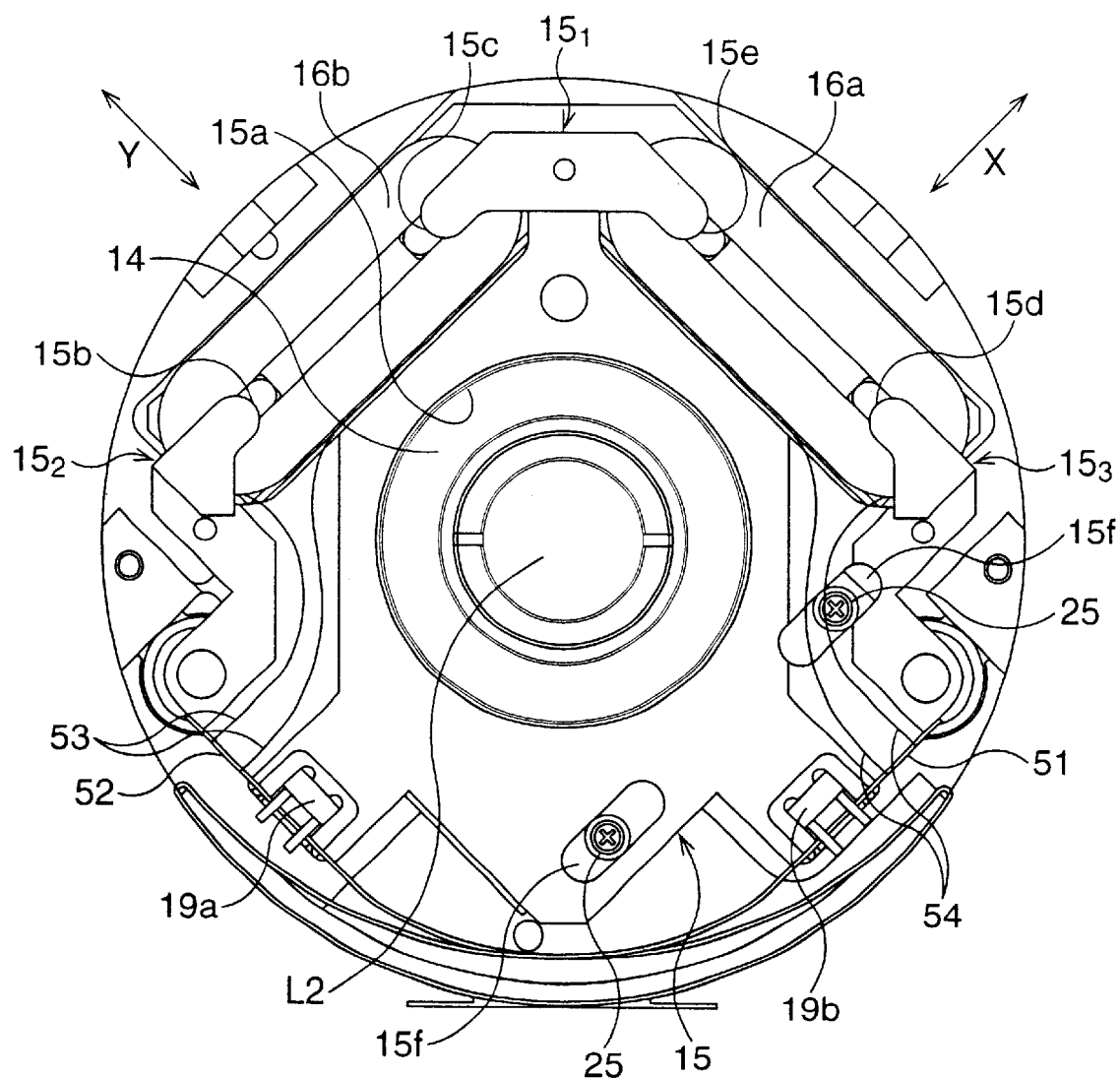
FIG. 5 is a front view showing an assembly of an annular plate body and a movable plate frame of the image-tremble-correcting unit.
Figure 6:
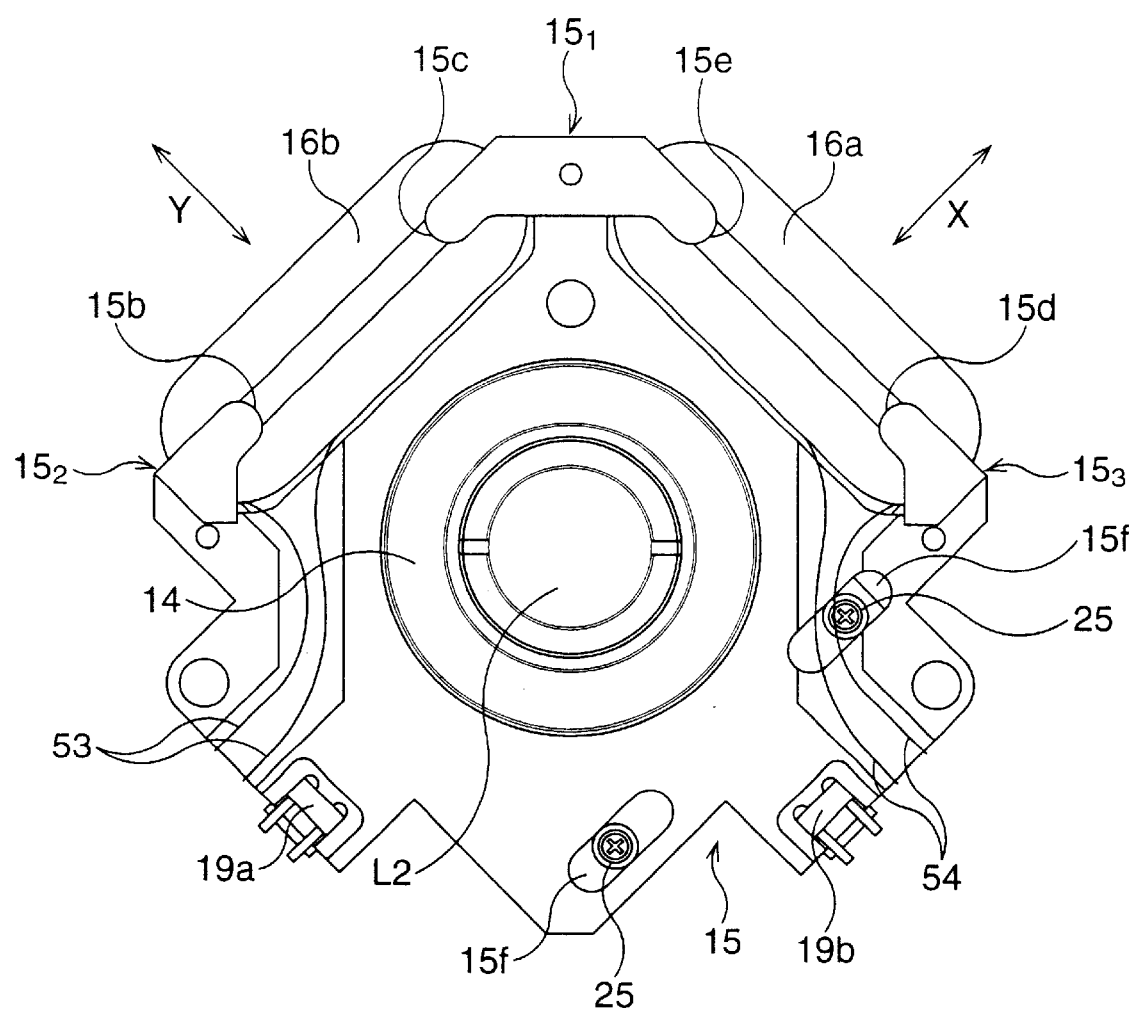
FIG. 6 is a front view showing the movable plate frame of the image-tremble-correcting unit.

On the other hand, as shown in FIGS. 4, 5 and 6, a pair of elongated guide slots 15f is formed in the movable plate frame 15, and the elongated guide slots 15f are aligned with each other along the X-axis of the X-Y coordinate system. Also, a pair of elongated guide slots 11d is formed in the annular plate body 11, as shown in FIG. 4, and the elongated guide slots 11d are aligned with each other along the Y-axis of the X-Y coordinate system.

When the parts 11, 12 and 15 are assembled as in FIG. 3, the two respective ring-like guide rollers 25 are slidably received in the elongated guide slots 15f, as best shown in FIGS. 5 and 6, and the two respective ring-like guide rollers 26 are slidably received in the elongated guide slots 11d. Thus, the movable plate frame 15 can moved along the X- and Y-axes of the X-Y coordinate system.

As shown in FIG. 4, an L-shaped plate element 20 is securely attached to an inner wall of the annular plate body 11 by three screws 21, and has two arm sections 20a and 20b which form a right angle. The arm section 20a extends along the Y-axis of the X-Y coordinate system, and the arm section 20b extends along the X-axis of the X-Y coordinate system. A first pair of elongated permanent magnets 22a is fixed on the arm section 20a to extend along the Y-axis of the X-Y coordinate system, and a second pair of elongated permanent magnets 22b is fixed on the arm section 20b to extend along the X-axis of the X-Y coordinate system.

On the other hand, the movable plate frame 15 is provided with a first electromagnetic coil 16a and a second electromagnetic coil 16b securely supported thereby, and the respective first and second electromagnetic coils 16a and 16b are aligned with the first and second pairs of elongated permanent magnets 22a and 22b along the optical axis O of the photographing lens system (L1 and L3).

When the parts 11, 12 and 15 are assembled as in FIG. 3, the first electromagnetic coil 16a is associated with the first pair of permanent magnets 22a to form a first driving system that moves the movable plate frame 15, and therefore the lens system (L2), along the X-axis of the X-Y coordinate system, and the second electromagnetic coil 16b is associated with the second pair of permanent magnets 22b to form a second driving system that moves the movable plate frame 15, and therefore the lens system (L2), along the Y-axis of the X-Y coordinate system.

In particular, when the first electromagnetic coil 16a is electrically energized in a magnetic field produced by the first pair of permanent magnets 22a, it is subjected to a driving force in accordance with Fleming's rule, such that the movable plate frame 15, and therefore the lens system (L2), is moved along the X-axis of the X-Y coordinate system. Similarly, when the second electromagnetic coil 16b is electrically energized in a magnetic field produced by the second pair permanent magnets 22b, it is subjected to a driving force in accordance with Fleming's rule, such that the movable plate frame 15, and therefore the lens system (L2), is moved along the Y-axis of the X-Y coordinate system. Of course, the direction of the driving force, to which each coil (16a, 16b) is subjected, depends on the direction in which electric current flows through each coil (16a, 16b), and the magnitude of the driving force depends on the amount of electric current flowing through each coil (16a, 16b).

As shown in FIGS. 4, 5 and 6, the movable plate frame 15 has a first infrared LED (light emitting diode) 19a and a second infrared LED (light emitting diode) 19b securely attached thereto. The first infrared LED 19a is arranged on the diametrical opposite side of the first electromagnetic coil 16a with respect to the circular opening 15a, and the second infrared LED 19b is arranged on the diametrical opposite side of the second electromagnetic coil 16b with respect to the circular-opening 15a.

On the other hand, as shown in FIG. 4, the annular plate body 11 has a first PSD (position sensitive device) 30a and a second PSD 30b securely attached thereto. The first PSD 30a is arranged on the diametrical opposite side of the first pair of permanent magnets 22a with respect to the circular opening 11a, and the second PSD 30b is arranged on the diametrical opposite side of the second pair of permanent magnets 22b with respect to the circular opening 11a. Note, each of the first and second PSD's 30a and 30b is formed as a one-dimensional or linear PSD.

When the parts 11, 12 and 15 are assembled as in FIG. 3, the first infrared LED 19a is associated with the first PSD 30a to form a first position-detecting system that detects a position of the movable plate frame 15, and therefore the lens system (L2), along the X-axis of the X-Y coordinate system. Similarly, the second infrared LED 19b is associated with the second PSD 30b to form a second position-detecting system that detects a position of the movable plate frame 15, and therefore the lens system (L2), along the Y-axis of the X-Y coordinate system.

In particular, the movable plate frame 15 is formed with a first fine slit (not visible in FIGS. 4, 5 and 6) which extends along the Y-axis of the X-Y coordinate system, and infrared light, emitted from the first infrared LED 19a, is made incident on the first PSD 30a through the first fine slit. Namely, the infrared light emitted from the first infrared LED 19a is formed into a sheet-like infrared light beam by the first fine slit, and the sheet-like infrared light beam is made incident on the first PSD 30a. An incident position, at which the sheet-like infrared light is made incident on the first PSD 30a, is shifted in accordance with the movement of the movable plate frame 15, and therefore the lens system (L2), along the X-axis of the X-Y coordinate system, and the output electric current from the first PSD 30a varies in accordance with the shift of the incident position. Thus, by detecting the variation of the output electric current of the first PSD 30a, it is possible to detect the position of the movable plate frame 15, and therefore the lens system (L2), along the X-axis of the X-Y coordinate system.

Similarly, the movable plate frame 15 is formed with a second fine slit (not visible in FIGS. 4, 5 and 6) which extends along the X-axis of the X-Y coordinate system, and infrared light, emitted from the second infrared LED 19b, is made incident on the second PSD 30b through the second fine slit. Namely, the infrared light emitted from the second infrared LED 19b is formed into a sheet-like infrared light beam by the second fine slit, and the sheet-like infrared light beam is made incident on the second PSD 30b. An incident position, at which the sheet-like infrared light is made incident on the second PSD 30b, is shifted in accordance with the movement of the movable plate frame 15, and therefore the lens system (L2), along the Y-axis of the X-Y coordinate system, and the output electric current from the second PSD 30b varies in accordance with the shift of the incident position. Thus, by detecting the variation of the output electric current of the second PSD 30b, it is possible to detect the position of the movable plate frame 15, and therefore the lens system (L2), along the Y-axis of the X-Y coordinate system.

As shown in FIG. 4, 5 and 6, the movable plate frame 15 is provided with first, second and third stopper members $15_1$, $15_2$ and $15_3$ to restrict the movement of the movable plate frame 15, and therefore the lens system (L2), along the X- and Y-axes of the X-Y coordinate system. In particular, the first stopper member $15_1$ is associated with ends of the first and second electromagnetic coils 16a and 16b which are adjacent to each other, and the respective second and third stopper members $15_2$ and $15_3$ are associated with the other ends of the first and second electromagnetic coils 16a and 16b which are away from the respective adjacent ends thereof. The first stopper member $15_1$ has two rounded end faces 15c and 15e, and the second and third stopper members $15_2$ and $15_3$ have rounded end faces 15b and 15d, respectively. The rounded end faces 15b and 15c are opposite to each other along the X-axis of the X-Y coordinate system, and the rounded end faces 15d and 15e are opposite to each other along the Y-axis of the X-Y coordinate system.

On the other hand, as best shown in FIG. 4, the annular yoke plate 12 is formed with a first set of edges 12b and 12c, opposite to each other along the X-axis of the X-Y coordinate system, and a second set of edges 12d and 12e opposite to each other along the Y-axis of the X-Y coordinate system.

When the parts 11, 12 and 15 are assembled as in FIG. 3, the rounded end faces 15b and 15c are operated in conjunction with the first set of edges 12b and 12c, such that the movement of the movable plate frame 15, and therefore the lens system (L2), is restricted to a distance value of 2×r along the X-axis of the X-Y coordinate system, as shown in FIG. 2. Similarly, the rounded end faces 15d and 15e are operated in conjunction with the second set of edges 12d and 12e, such that the movement of the movable plate frame 15, and therefore the lens system (L2), is restricted to a distance value of 2×r along the Y-axis of the X-Y coordinate system, as shown in FIG. 2. In short, the movement of the image-tremble-correcting lens system (L2) is restricted to the square area SA shown in FIG. 2.

Figure 7:
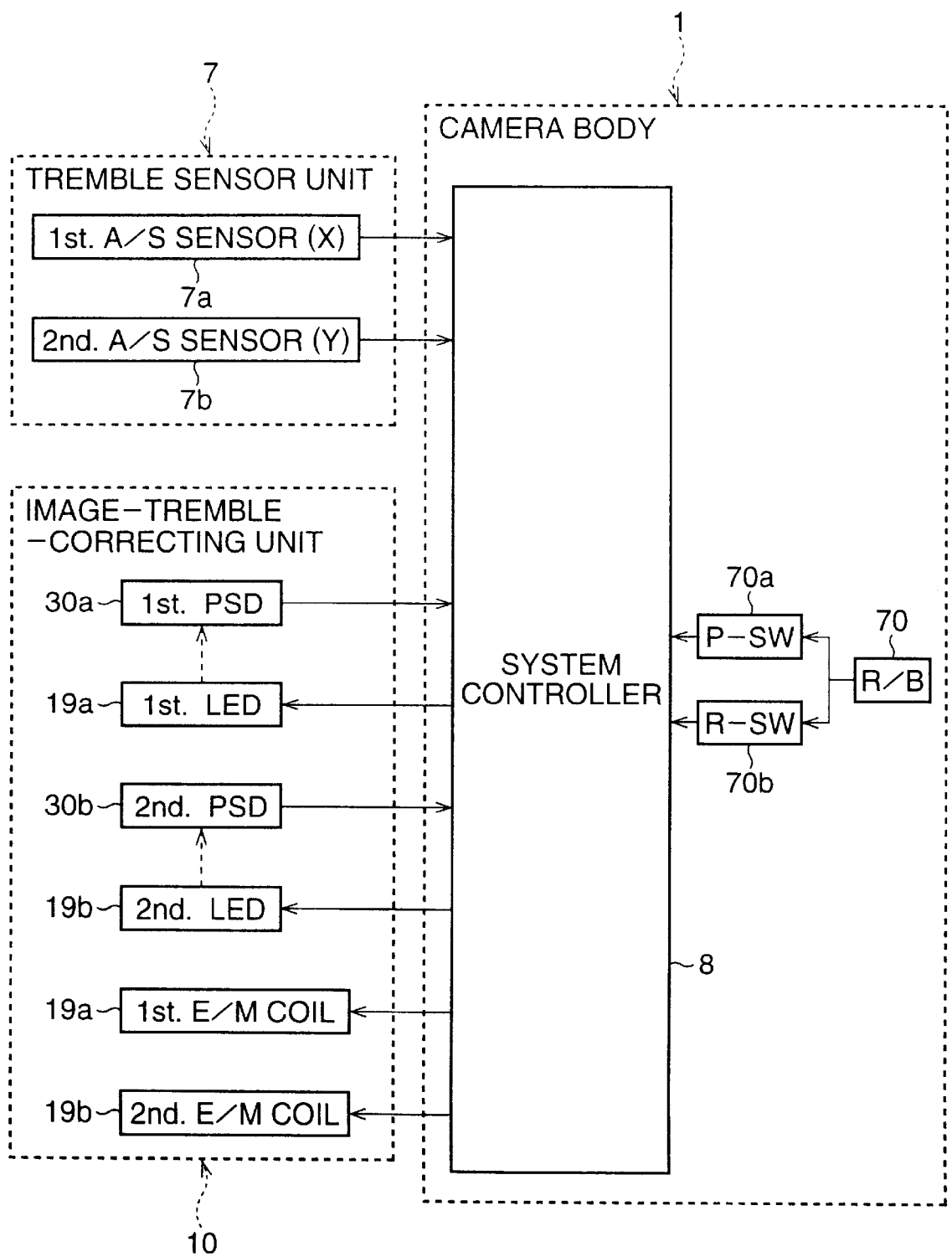
FIG. 7 is a block diagram of the SRL camera partially illustrated in FIG. 1.

FIG. 7 shows a block diagram of the camera partially illustrated in FIG. 1. As shown in this drawing, a system controller 8 is provided in the camera body 1, and is constituted as a microcomputer comprising a central processing unit (CPU), a read-only memory (ROM) for storing programs and constants, a random-access memory (RAM) for storing temporary data, and an input/output interface circuit (I/O). Of course, the system controller is used to control the camera as a whole.

When the lens barrel 9 (FIG. 1) is mounted on a mount (not shown) of the camera body 1, the image-tremble-correcting unit 10 is electrically connected to the system controller 8, as shown in FIG. 7. To this end, as shown in FIG. 4, a first flexible printed circuit sheet 50 is led into the movable plate frame 15, and a second flexible printed circuit sheet 60 is led into the annular plate body 11. The first and second flexible printed circuit sheets 50 and 60 are extended to an electric connector (not shown), provided in a terminal end of the lens barrel 9, which is coupled to an electric connector provided in the mount of the camera body 1 when the lens barrel 9 is mounted on the mount of the camera body 1.

As best shown in FIGS. 5, a portion of the first flexible printed circuit sheet 50, led into the movable plate frame 15, branches into first and second sections 51 and 52. A pair of terminal pins of the first infrared LED 19a is soldered to a circuit pattern formed on the second section 52, and a pair of electric lead lines 53, extending from the second electromagnetic coil 16b, is soldered to another circuit pattern formed on the second section 52. Similarly, a pair of terminal pins of the second infrared LED 19b is soldered to a circuit pattern formed on the first section 51, and a pair of electric lead lines 54, extending from the first electromagnetic coil 16a, is soldered to another circuit pattern formed on the first section 51.

Although not visible in FIG. 4, a portion of the second flexible printed circuit sheet 60, led into the annular plate body 11, also branches into first and second sections. Terminal pins of the first PSD 30a are soldered to a circuit pattern formed on the first section, and terminal pins of the second PSD 30b are soldered to a circuit pattern formed on the second section.

In short, when the lens barrel 9 is mounted on the mount of the camera body 1, the aforesaid electric connectors are coupled to each other, thereby establishing the electrical connection between the system controller 8 and the image-tremble-correcting unit 10, as shown in FIG. 7.

Although not shown in FIG. 1, a tremble sensor unit for sensing a tremble of the camera is suitably assembled in the lens barrel 9. In FIG. 7, the tremble sensor unit is indicated by reference 7, and includes a first angular speed sensor 7a for detecting an angular speed around the X-axis of the X-Y coordinate system, and a second angular speed sensor 7b for detecting an angular speed around the Y-axis of the X-Y coordinate system. When the lens barrel 9 is mounted on the mount of the camera body 1, the tremble sensor unit 7 is also electrically connected to the system controller 8, as shown in FIG. 7. Note, each of the first and second angular speed sensors 7a and 7b may be formed as an gyro-type angular speed sensor.

As shown in FIG. 7, the camera has a release switch button (R/B) 70 provided at a suitable location on the camera body 1. As well known, in the single lens reflex (SLR) type camera, the release switch button 70 is associated with both a photometry switch (P-SW) 70a and a release switch (R-SW) 70b. When the release switch button 70 is partly depressed, the photometry switch 70a is turned ON, and, when the release switch button 70 is fully depressed, the release switch 70b is turned ON.

The photometry switch 70a is associated with a photometry circuit (not shown), including a photometry sensor, operated under control of the system controller 8. When the photometry switch 70a is turned ON by partly depressing the release switch button 70, the photometry circuit is operated to detect a quantity of light, reflected from an image to be photographed. Simultaneously, both the tremble sensor unit 7 and the image-tremble-correcting unit 10 are operated to correct a tremble of the image to be photographed, which is caused by an oscillation of the camera due to, for example, a hand tremble.

As is well known, in the SRL camera, the release switch 70b is associated with a mirror drive mechanism (not shown) for driving a quick-return mirror and a focal-plane shutter drive mechanism (not shown) for driving a leading shutter curtain and a trailing shutter curtain. When the release switch 70b is turned ON by fully depressing the release switch button 70, both the mirror drive mechanism and the focal-plane shutter drive mechanism are operated to perform a photographing exposure operation. The operation of both the tremble sensor unit 7 and the image-tremble-correcting unit 10 is continued until the photographing exposure operation is completed.

Figure 8:
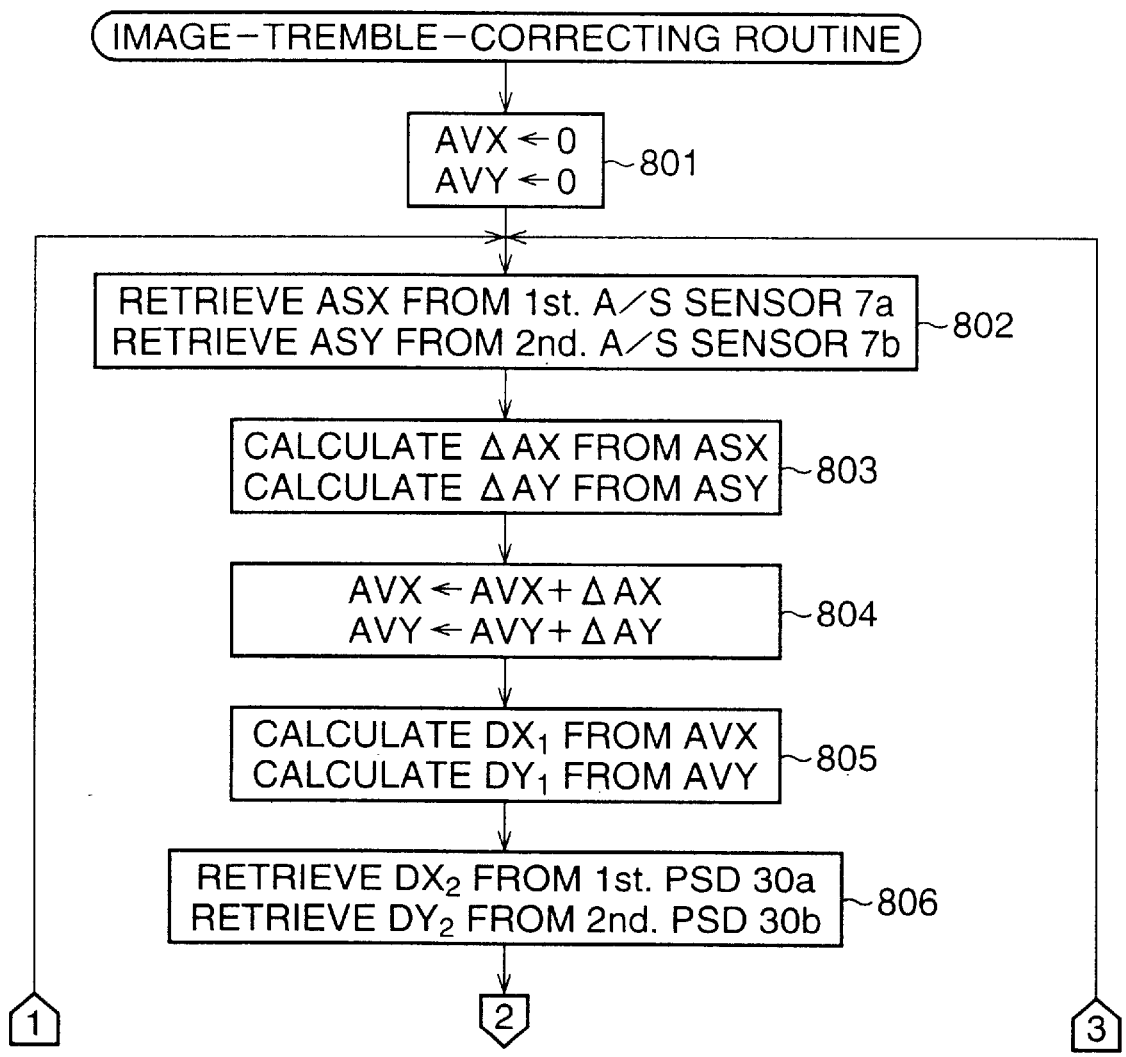
FIG. 8 is a flowchart of a part of an image-tremble-correcting routine.
Figure 9:
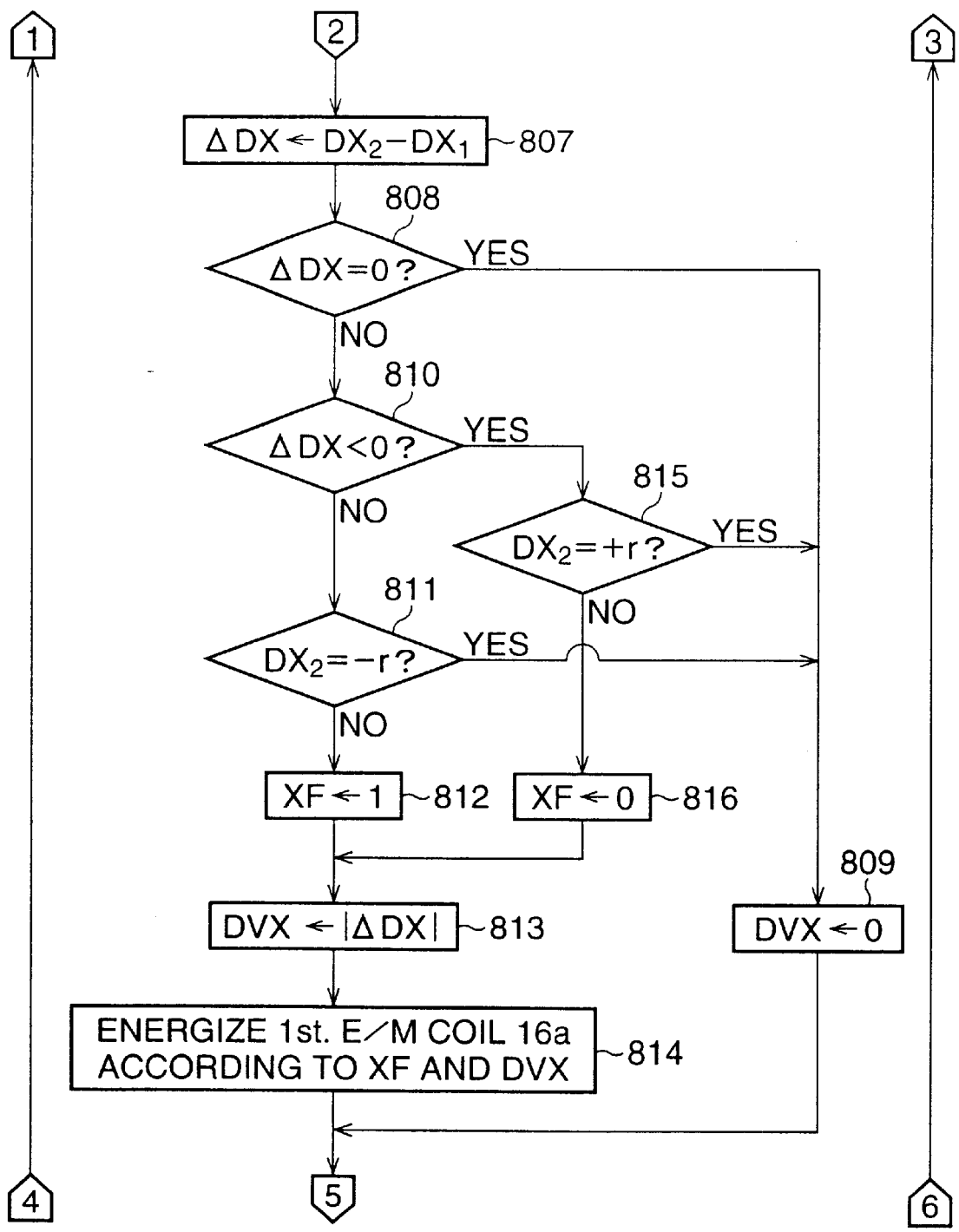
FIG. 9 is a flowchart of another part of the image-tremble-correcting routine.
Figure 10:
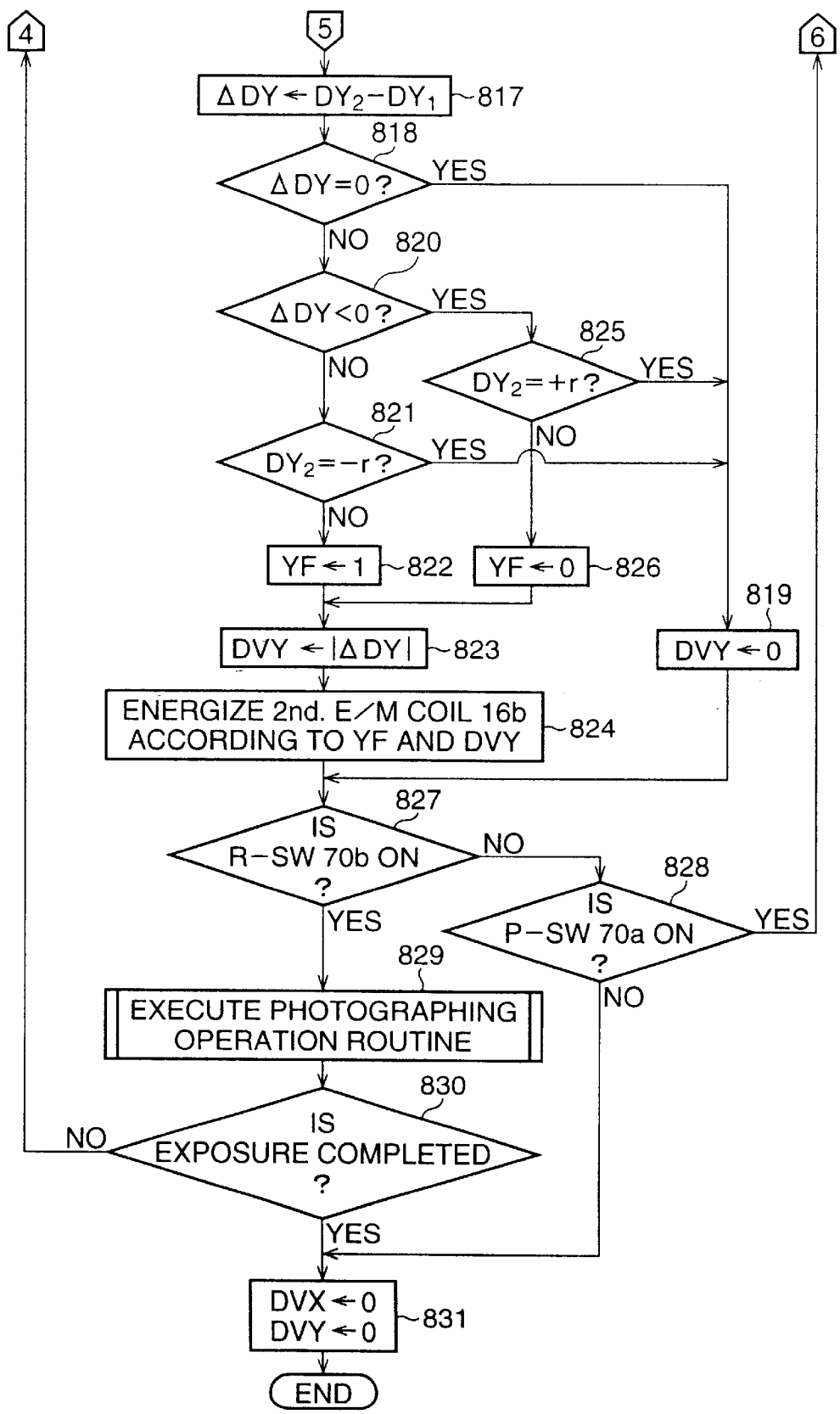
FIG. 10 is a flowchart of the remainder of the image-tremble-correcting routine.

FIGS. 8, 9 and 10 show a flowchart of an image-tremble-correcting routine executed in the system controller 8. Note, the execution of the routine is started by turning ON the photometry switch 70a, and execution of the routine comprising steps 802 to 828 is repeated at suitable regular short time intervals of, for example, 1 ms, as long as the photometry switch 70a is turned ON.

At step 801, a first variable "AVX" and a second variable "AVY" are initialized to "0". The first variable "AVX" represents a relative angular position of the X-axis of the X-Y coordinate system, and the second variable "AVY" represents a relative angular position of the Y-axis of the X-Y coordinate system. Namely, both the first and second variables "AVX and "AVY" represent a relative angular position of the X-Y coordinate system (i. e. the camera). In short, when the photometry switch 70a is turned ON, the position of the X-Y coordinate system (i.e. the camera) is set as the initial angular position (AVX=0 and AVY=0). Note, the first and second variables "AVX and "AVY" are previously defined in the ROM of the system controller 8.

At step 802, a first angular speed data "ASX" is retrieved from the first angular speed sensor 7a, and a second angular speed data "ASY" is retrieved from the second angular speed sensor 7b. The respective first and second angular speed data "ASX" and "ASY" represent angular speeds around the X- and Y-axes of the X-Y coordinate system, which are caused by an oscillation of the camera due to, for example, a hand tremble. Namely, both the first and second angular speed data "ASX" and "ASY" represent a magnitude of the oscillation of the camera, and therefore, the tremble of an image to be photographed. Note, the first and second angular speed data "ASX" and "ASY" are temporary stored in the RAM of the system controller 8.

At step 803, a first angular displacement data "ΔAX" is calculated from the first angular speed data "ASX" with respect to the X-axis of the X-Y coordinate system, and a second angular displacement data "ΔAY" is calculated from the second angular speed data "ASY" with respect to the Y-axis of the X-Y coordinate system. Then, at step 804, the following calculations are performed:

$$AVX \rightarrow AVX + \Delta AX$$

$$AVY \rightarrow AVY + \Delta AY$$

Both the calculated results "AVX" and "AVY" represent a relative angular displacement of the X-Y coordinate system (i.e. the camera) in the plane defined by the X- and Y-axes of the X-Y coordinate system, which is measured from the last angular position of the X-Y coordinate system. Namely, the first variable "AVX" represents a relative angular position of the X-axis of the X-Y coordinate system with respect to the last angular position of the X-axis thereof, and the second variable "AVY" represents a relative angular position of the Y-axis of the X-Y coordinate system with respect to the last angular position of the Y-axis thereof. Note that, of course, the initially-calculated results "AVX" and "AVY" represent a relative angular position of the X-Y coordinate system with respect to the initial angular position thereof (AVX=0 and AVY=0).

At step 805, an X-component $DX_1$ of the angular displacement of the X-axis of the X-Y coordinate system is calculated from the calculated result "AVX", and a Y-component $DY_1$ of the angular displacement of the Y-axis of the X-Y coordinate system is calculated from the calculated result "AVY". Note, the respective X-component $DX_1$ and Y-component $DY_1$ are temporary stored as X-displacement data and Y-displacement data in the RAM of system controller 8.

At step 806, X-position data $DX_2$ is retrieved from the first PSD 30a, and Y-position data $DY_2$ is retrieved from the second PDS 30b. Note, the X-position data and Y-position data are temporarily stored in the RAM of the system controller 8.

At step 807, a difference ADX is calculated as follows:

$$\Delta DX \rightarrow DX_2 - DX_1$$

Then, at step 808, it is determined whether the difference ΔDX is equal to "0". If ΔDX=0, i.e. if there is substantially no tremble of the image to be photographed along the X-axis of the X-Y coordinate system, the control proceeds to step 809, in which a drive variable DVX is set to "0". Note, the drive variable DVX is used to determine an magnitude of an electric current flowing through the first electromagnetic coil 16*a*. Of course, when the setting of "0" is given to the drive variable DVX, the electric current cannot flow through the first electromagnetic coil 16*a*, i.e. the lens system (L2) cannot be moved along the X-axis of the X-Y coordinate system.

At step 808, if $\Delta DX \neq 0$, the control proceeds to step 810, in which it is determined whether the difference $\Delta DX$ is negative or positive. If the difference $\Delta DX$ is positive, i.e. if the lens system (L2) should be moved toward the negative side along the X-axis of the X-Y coordinate system ($DX_2 > DX_1$), the control proceeds to step 811, in which it is determined whether the X-position data $DX_2$ is equivalent to the negative limit position (−r).

If $\Delta DX > 0$ (step 810), and if $DX_2 = -r$ (step 811), this means that the X-displacement data $DX_1$ is smaller than "−r", i.e. that the X-displacement data $DX_1$ (i.e. the amount of tremble of the image) exceeds the negative limit of correction (−r). Thus, the control proceeds from step 811 to step 809, in which the drive variable DVX is set to "0", thereby prohibiting the movement of the lens system (L2) along the X-axis of the X-Y coordinate system.

At step 811, if $DX_2 \neq -r$, i.e. if $DX_2 > -r$, the control proceeds to step 812, in which a flag XF is set to "1". Note, the flag XF indicates a direction in which an electric current should flow through the first electromagnetic coil 16*a*. Namely, if XF=0, the electric current flows through the first electromagnetic coil 16*a* so that the lens system (L2) is moved toward the positive side along the X-axis of the X-Y coordinate system, and if XF=1, the electric current flows through the first electromagnetic coil 16*a* so that the lens system (L2) is moved toward the negative side along the X-axis of the X-Y coordinate system.

At step 813, the drive variable DVX is set to an absolute value of the difference $\Delta DX$. Then, at step 814, the first electromagnetic coil 16*a* is electrically energized in accordance with the value of the flag XF and the value of the drive variable DVX. In particular, the electric current flows through the first electromagnet coil 16*a* in the direction indicated by the flag XF (=1), so that the lens system (L2) is moved toward the negative side along the X-axis of the X-Y coordinate system, and the magnitude of the electric current is determined by the value $|\Delta DX|$ of the drive variable DVX. Of course, the larger the magnitude of the electric current, the higher the acceleration of the lens system (L2).

At step 810, if the difference $\Delta DX$ is negative, i.e. if the lens system (L2) should be moved toward the positive side along the X-axis of the X-Y coordinate system ($DX_2 < DX_1$), the control proceeds to step 815, in which it is determined whether the X-position data $DX_2$ is equivalent to the positive limit position (+r).

If $\Delta DX < 0$ (step 810), and if $DX_2 = +r$ (step 815), this means that the X-displacement data $DX_1$ is larger than "+r", i.e. that the X-displacement data $DX_1$ (i.e. the amount of tremble of the image along the X-axis of the Y-coordinate system) exceeds the positive limit of correction (+r). Thus, the control proceeds from step 815 to step 809, in which the drive variable DVX is set to "0", thereby prohibiting the movement of the lens system (L2) along the X-axis of the X-Y coordinate system.

At step 815, if $DX_2 \neq +r$, i.e. if $DX_2 < +r$, the control proceeds to step 816, in which the flag XF is set to "0". Then, at step 813, the drive variable DVX is set to an absolute value of the difference $\Delta DX$, and at step 814, the first electromagnetic coil 16*a* is electrically energized in accordance with the value of the flag XF and the value of the drive variable DVX. Namely, the electric current flows through the first electromagnet coil 16*a* in the direction indicated by the flag XF (=0), so that the lens system (L2) is moved toward the positive side along the X-axis of the X-Y coordinate system, and the magnitude of the electric current is determined by the value $|DX|$ of the drive variable DVX.

At step 817, a difference $\Delta DY$ is calculated as follows:

$$\Delta DY \leftarrow DY_2 - DY_1$$

Then, at step 818, it is determined whether the difference $\Delta DY$ is equal to "0". If $\Delta DY = 0$, i.e. if there is substantially no tremble of the image to be photographed along the Y-axis of the X-Y coordinate system, the control proceeds to step 819, in which a drive variable DVY is set to "0". Note, the drive variable DVY is used to determine an magnitude of an electric current flowing through the second electromagnetic coil 16*b*. Of course, when the setting of "0" is given to the drive variable DVY, the electric current cannot flow through the second electromagnetic coil 16*b*, i.e. the lens system (L2) cannot be moved along the Y-axis of the X-Y coordinate system.

At step 818, if $\Delta DY \neq 0$, the control proceeds to step 820, in which it is determined whether the difference $\Delta DY$ is negative or positive. If the difference $\Delta DY$ is positive, i.e. if the lens system (L2) should be moved toward the negative side along the Y-axis of the X-Y coordinate system ($DY_2 > DY_1$), the control proceeds to step 821, in which it is determined whether the Y-position data $DY_2$ is equivalent to the negative limit position (−r).

If $\Delta DY > 0$ (step 820), and if $DY_2 = -r$ (step 821), this means that the Y-displacement data $DY_1$ is smaller than "−r", i.e. that the Y-displacement data $DY_1$ (i.e. the amount of tremble of the image along the Y-axis of the Y-coordinate system) exceeds the negative limit of correction (−r). Thus, the control proceeds from step 821 to step 819, in which the drive variable DVY is set to "0", thereby prohibiting the movement of the lens system (L2) along the Y-axis of the X-Y coordinate system.

At step 821, if $DY_2 \neq -r$, i.e. if $DY_2 > -r$, the control proceeds to step 822, in which a flag YF is set to "1". Note, the flag YF indicates a direction in which an electric current should flow through the second electromagnetic coil 16*b*. Namely, if YF=0, the electric current flows through the second electromagnetic coil 16*b* so that the lens system (L2) is moved toward the positive side along the Y-axis of the X-Y coordinate system, and if YF=1, the electric current-flows through the second electromagnetic coil 16*b* so that the lens system (L2) is moved toward the negative side along the Y-axis of the X-Y coordinate system.

At step 823, the drive variable DVY is set to an absolute value of the difference $\Delta DY$. Then, at step 824, the second electromagnetic coil 16*b* is electrically energized in accordance with the value of the flag YF and the value of the drive variable DVY. In particular, the electric current flows through the second electromagnet coil 16*b* in the direction indicated by the flag YF (=1), so that the lens system (L2) is moved toward the negative side along the Y-axis of the X-Y coordinate system, and the magnitude of the electric current is determined by the value $|\Delta DY|$ of the drive variable DVY. Of course, the larger the magnitude of the electric current, the higher the acceleration of the lens system (L2).

At step 820, if the difference $\Delta DY$ is negative, i.e. if the lens system (L2) should be moved toward the positive side along the Y-axis of the X-Y coordinate system ($DY_2<DY_1$), the control proceeds to step 825, in which it is determined whether the Y-position data $DY_2$ is equivalent to the positive limit position (+r).

If $\Delta DY<0$ (step 820), and if $DY_2=+r$ (step 825), this means that the Y-displacement data $DY_1$ is larger than "+r", i.e. that the Y-displacement data $DY_1$ (i.e. the amount of tremble of the image along the Y-axis of the Y-coordinate system) exceeds the positive limit of correction (+r). Thus, the control proceeds from step 825 to step 819, in which the drive variable DVY is set to "0", thereby prohibiting the movement of the lens system (L2) along the Y-axis of the X-Y coordinate system.

At step 825, if $DY_2 \neq +r$, i.e. if $DY_2<+r$, the control proceeds to step 826, in which the flag YF is set to "0". Then, at step 823, the drive variable DVY is set to an absolute value of the difference $\Delta DY$, and at step 824, the second electromagnetic coil 16b is electrically energized in accordance with the value of the flag YF and the value of the drive variable DVY. Namely, the electric current flows through the second electromagnet coil 16b in the direction indicated by the flag YF (=0), so that the lens system (L2) is moved toward the positive side along the Y-axis of the X-Y coordinate system, and the magnitude of the electric current is determined by the value $|\Delta DY|$ of the drive variable DVY.

At step 827, it is determined whether the release switch 70b has been turned ON, i.e. whether the release switch button 70 has been fully depressed. If the turn-ON of the release switch 70b is not confirmed, the control proceeds to step 828, in which it is determined whether the photometry switch 70a is still turned ON. If the photometry switch 70a is still turned ON, the control returns to step 802, and thus a tremble of an image to be photographed is repeatedly corrected as long as the photometry switch 70a is turned ON.

At step 827, when it is confirmed that the release switch 70b is turned ON, the control proceeds to step 829, in which an photographing operation routine (not shown) is executed. In the execution of the photographing operation routine, the aforesaid mirror drive mechanism and focal-plane shutter drive mechanism are operated to perform a photographing exposure operation. Then, at step 830, it is determined whether the photographing exposure operation has been completed. If the photographing exposure-operation is not completed, the control returns to step 802, whereby a tremble of an image to be photographed is repeatedly corrected until the photographing exposure operation is completed.

At step 830, when the completion of the photographing exposure operation is confirmed, the control proceeds to step 831, in which the drive variables DVX and DVY are set to "0", thereby prohibiting the electrical energization of the first and second electromagnetic coils 16a and 16b. Thereafter, the image-tremble-correction routine ends.

At step 828, when it is confirmed that the photometry switch 70a is turned OFF, i.e. when the release switch button 70 is released from the depression without fully depressing the release switch button 70, the control proceeds from step 828 to step 831, in which the drive variables DVX and DVY are set to "0", thereby prohibiting the electrical energization of the first and second electromagnetic coils 16a and 16b. Thereafter, the image-tremble-correction routine ends.

As is apparent from the foregoing, according to the present invention, since the X-Y rectangular coordinate system is set such that the X- and Y-axes thereof define the angle of 45° with the horizontal axis HA and the vertical axis VA (FIG. 2), it is possible to widen the vertical and horizontal limitations of the lens system (L2) without increasing the mechanical bulkiness of the lens barrel 9. Namely, if the X-Y rectangular coordinate system is defined such that the X- and Y-axes thereof extend horizontally and vertically, the movement of the lens system (L2) is restricted in a square area SA' as shown in FIG. 2, and thus a maximum range, in which the lens system (L2) can be moved along each of the horizontal axis HA and the vertical axis VA, is limited by a distance of "2r", which is shorter than the aforesaid distance of $R=(8r^2)^{1/2}$. In short, according to the present invention, it is possible to widen vertical and horizontal limitations of movement of the lens system (L2) to about 1.4 times in comparison with the case of the square area SA'.

In the aforesaid embodiment, although the image-tremble-correcting system is incorporated in the single lens reflex (SLR) type camera, it should be understood that the present invention may be embodied in another optical instrument, such as a video camera, a telescope, a pair of binoculars or the like.

Finally, it will be understood by those skilled in the art that the foregoing description is of a preferred embodiment of the system, and that various changes and modifications may be made to the present invention without departing from the spirit and scope thereof.

The present disclosure relates to subject matters contained in Japanese Patent Applications No. 2000-039320 (filed on Feb. 17, 2000) which is expressly incorporated herein, by reference, in its entirety.

What is claimed is:

1. An image-tremble-correcting system for an optical instrument, having an optical focussing system for producing a focussed image, to correct a tremble of said focussed image caused by an oscillation of said optical instrument, which comprises:

a movable optical tremble-correction system assembled in the optical focussing system of said optical instrument;

an X-Y rectangular coordinate system which is defined on a geometrical plane perpendicular to an optical axis of said optical focussing system, an origin of said X-Y rectangular coordinate system coinciding with the optical axis of said optical focussing system, the X- and Y-axes thereof defining an angle of 45° with a horizontal axis and a vertical axis defined on said geometrical plane when said optical instrument is positioned at a usual attitude;

a first position-detecting system that detects a position of said movable optical tremble-correction system along the X-axis of said X-Y rectangular coordinate system;

a second position-detecting system that detects a position of said movable optical tremble-correction system along the Y-axis of said X-Y rectangular coordinate system;

a first driving system that moves said movable optical tremble-correction system along the X-axis of the X-Y rectangular coordinate system;

a second driving system that moves said movable optical tremble-correction system along the Y-axis of the X-Y rectangular coordinate system;

a tremble-sensor system that detects an amount of tremble of said focussed image with respect to said X-Y rectangular coordinate system; and a controller that controls said first and second driving system to move said movable optical tremble-correction system along the X- and Y-axes of the X-Y rectangular coordinate system, such that the amount of tremble of said focussed image is neutralized.

2. An image-tremble-correcting system as set forth in claim 1, wherein said movable optical tremble-correction system is movable along the X-axis and the Y-axis of said X-Y rectangular coordinate system to a same extent, whereby the movement of the movable optical tremble-correction system is restricted in a square area.

3. An image-tremble-correcting system as set forth in claim 1, further comprising:

a first limit-position-determination system that determines whether the position detected by said first position-detecting system is a first limit position along the X-axis of said X-Y rectangular coordinate system;

a first correction-limit-determination system that determines whether an amount of the tremble of said focussed image along the X-axis of said X-Y rectangular coordinate system exceeds said first limit position when it is determined by said first limit-position-determination system that the position detected by said first position-detecting system is said first limit position along the X-axis of said X-Y rectangular coordinate system;

a second limit-position-determination system that determines whether the position detected by said second position-detecting system is a second limit position along the Y-axis of said X-Y rectangular coordinate system; and a second correction-limit-determination system that determines whether an amount of tremble of said focussed image along the Y-axis of said X-Y rectangular coordinate system exceeds said second limit position when it is determined by said second limit-position-determination system that the position detected by said second position-detecting system is said second limit position along the Y-axis of said X-Y rectangular coordinate system, wherein said controller ceases controlling said first driving system when it is determined by said first correction-limit-determination system that the amount of tremble of said focussed image along the X-axis of said X-Y rectangular coordinate system exceeds said first limit position, and wherein said controller ceases controlling said second driving system when it is determined by said second correction-limit-determination system that the amount of tremble of said focussed image along the Y-axis of said X-Y rectangular coordinate system exceeds said second limit position.

4. An image-tremble-correcting system as set forth in claim 1, wherein said tremble-sensor system includes:

a first angular speed sensor that detects a first angular speed of said optical instrument around the X-axis of said X-Y rectangular coordinate system; and a second angular speed sensor that detects a second angular speed of said optical instrument around the Y-axis of said X-Y rectangular coordinate system, the controlling of said respective first and second driving systems by said controller being performed on the basis of said first and second angular speed detected by said first and second angular speed sensors.

5. An image-tremble-correcting system as set forth in claim 4, wherein said respective first and second driving systems comprise a first electromagnetic driving system and a second electromagnetic driving system, both a direction and a magnitude of an electric current, flowing through said first electromagnetic driving system, being controlled by said controller on the basis of the position of said movable optical tremble-correction system, detected by said first position-detecting system, and the first angular speed detected by said first angular speed sensor, thereby determining both a direction and an acceleration of the movement of said movable optical tremble-correction system along the X-axis of said X-Y rectangular coordinate system, both a direction and a magnitude of an electric current, flowing through said second electromagnetic driving system, being controlled by said controller on the basis of the position of said movable optical tremble-correction system, detected by said second position-detecting system, and the second angular speed detected by said second angular speed sensor, thereby determining both a direction and an acceleration of the movement of said movable optical tremble-correction system along the Y-axis of said X-Y rectangular coordinate system.

6. An image-tremble-correcting system as set forth in claim 1, wherein said optical instrument comprises a single lens reflex camera having a photographing optical system as said optical focussing system, and said movable optical tremble-correction system, said first and second position-detecting systems, and said first and second driving systems being assembled as an image-tremble-correcting unit in said photographing optical system.

7. An image-tremble-correcting system for an optical instrument, which includes an optical focusing system for producing a focused image, the image-tremble-correcting system comprising:

a movable optical tremble-correction lens system in the optical focusing system;

a first driving system that exerts a first drive force on the optical tremble-correction lens system along an X-axis in a geometric plane perpendicular to an optical axis of the optical focusing system, moving the optical tremble-correction lens system in a direction parallel to the first drive force, the X-axis forming a 45 degree angle with a horizontal reference on the geometric plane when the optical instrument is positioned in a usual attitude;

a second driving system that exerts a second drive force on the optical tremble-correction lens system along a Y-axis in the geometric plane, moving the optical tremble-correction lens system in a direction parallel to the second drive force, the Y-axis being perpendicular to the X-axis and intersecting the X-axis at a point of intersection between the optical axis and the geometric plane;

a tremble-sensor system that detects an amount of tremble of the focused image with respect to the X-axis and the Y-axis; and a controller that controls the first driving system and the second driving system to move the movable optical tremble-correction lens system along at least one of the X-axis and the Y-axis to neutralize the amount of tremble.

8. The image-tremble-correcting system for an optical instrument as set forth in claim 7, wherein the optical instrument is positioned in the usual attitude when a central lengthwise axis of a rectangular frame of photographic film is substantially parallel to the horizon.

* * * * *